W. POTTER.
LEVEL AND PLUMB.
APPLICATION FILED DEC. 3, 1907.
1,004,301.
Patented Sept. 26, 1911.
2 SHEETS—SHEET 2.
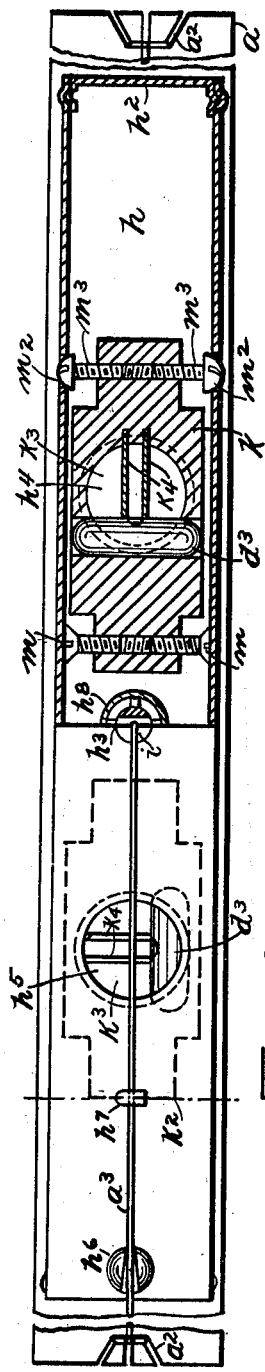
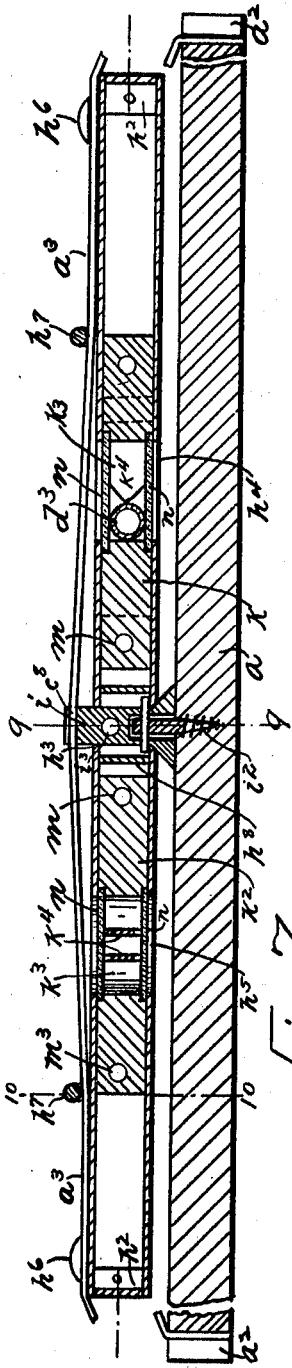
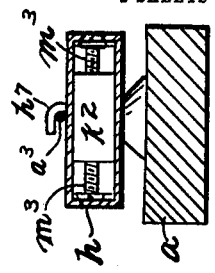
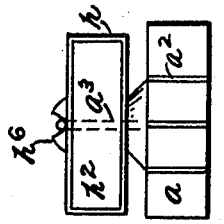
Witnesses:
W. J. Borth
E. A. Beselin
Inventor
William Potter
By his Attorney
J. Chris Larsen

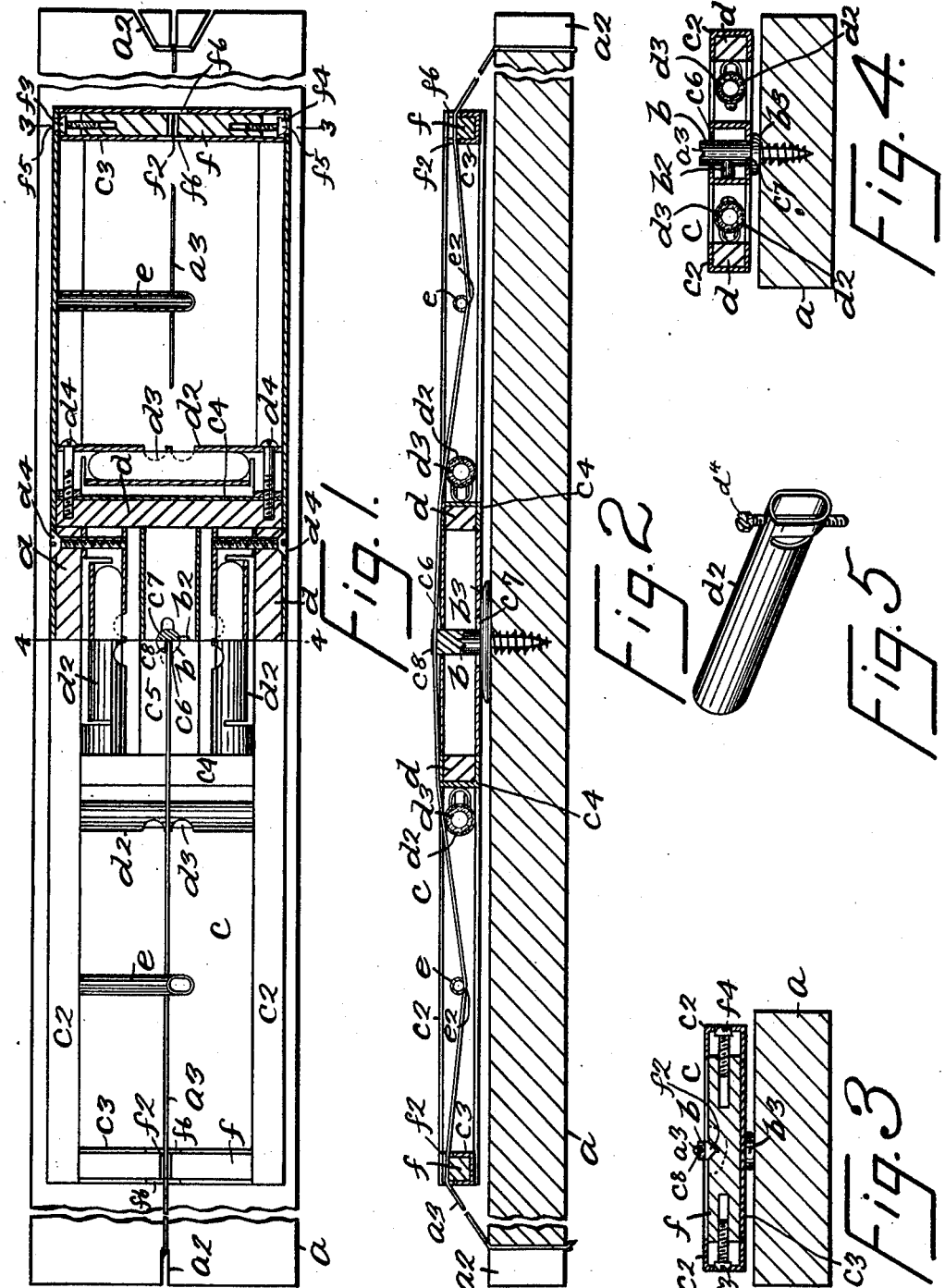

UNITED STATES PATENT OFFICE.

WILLIAM POTTER, OF NEW YORK, N. Y.

LEVEL AND PLUMB.

1,004,301. Specification of Letters Patent. Patented Sept. 26, 1911.

Application filed December 3, 1907. Serial No. 404,926.

*To all whom it may concern:*

Be it known that I, WILLIAM POTTER, a citizen of the United States of America, and residing at New York, in the county of New York and State of New York, have invented certain new and useful Improvements in Levels and Plumbs, of which the following is a specification, such as will enable those skilled in the art to which it appertains to make and use the same.

This invention relates to plumbs and levels and is an improvement over that shown in my patent of the United States of America No. 812,449, of February 13, 1906, and the object thereof being to provide such an instrument wherein the spirit tubes are entirely protected, which is adjustably and detachably connected with a straight-edge and which is practical and economical in construction and use; a still further object being to provide, in such a device, a plurality of spirit tubes for reading in several positions and which are independently adjustable.

My invention is fully described in the following specification, of which the accompanying drawings form a part, in which the several parts thereof are designated by the same reference characters in each of the views, and in which:—

Figure 1 is a plan view of one form of embodiment of my invention, one half being in section; Fig. 2 is a longitudinal vertical section thereof; Fig. 3 is a section on the line 3—3 of Fig. 1; Fig. 4 is a section on the line 4—4 of Fig. 1; Fig. 5 is a detail view of my method of adjusting the spirit tubes; Fig. 6 is a view, similar to Fig. 1, of another form of my invention; Fig. 7 is a longitudinal vertical section thereof; Fig. 8 is an end view thereof; Fig. 9 is a section on the line 9—9 of Fig. 7; and Fig. 10 is a section on the line 10—10 of Fig. 7.

In Figs. 1 to 5 of the drawings, I have shown a straight-edge $a$, provided with the usual slots $a^2$ for a line $a^3$ which is a substitute for the usual plumb line and, centrally of the said straight-edge, I provide a detachable post $b$ having a flange $b^3$ and a lug $b^2$. This form of instrument comprises a frame $c$ composed of side members $c^2$, end members $c^3$ and transverse brace members $c^4$ of channel metal, the open sides of which are interiorly directed with the exception of the end members $c^3$ in which the open side is upwardly directed, and at $c^5$ I provide a longitudinal member which has central openings therethrough for the passage of the post $b$ whereby the frame may be pivotally mounted upon the straight-edge and the opening $c^7$ has projecting recesses for the passage of the lug $b^2$ whereas the opening $c^6$ fits the said post and, in the top of the said post, I provide a slot $c^8$ for the line $a^3$.

Arranged within the channel members $c^2$ and $c^4$ are blocks $d$ of wood or similar material and which serve as supports for the metal tubes $d^2$ within which are secured the spirit tubes $d^3$ and, in practice, I make a cut almost through the ends of the tubes $d^2$ and compress the said ends as shown Fig. 5 and pass therethrough screws $d^4$ which hold the said tubes in position and, the compressed ends being resilient, rotation of the said screws adjusts the corresponding ends of the spirit tubes.

Secured within the frame $c$ intermediate of the center and the ends thereof are arms $e$ provided with slots $e^2$ in a central line of said frame and which serve as stays for the line $a^3$ and in the end members $c^3$ are blocks $f$ also provided with slots for the said line, said blocks being transversely adjustable by means of screws $f^3$ and $f^4$ operable through openings $f^5$, and the members are similarly recessed as shown at $f^6$.

In Figs. 6 to 10, inclusive, I have shown a frame or casing $h$ which is preferably an angular tube provided with detachable end closures $h^2$ and having openings $h^3$, $h^4$ and $h^5$ therethrough, of which $h^3$ is similar to the openings $c^6$ and $c^7$ previously described and serving as guides for a post $i$ consisting of a body member flanged at its base and having a screw $i^2$ loosely secured therein and being provided with the slot $c^8$ and an opening $i^3$ by means of which the post may be secured in position by passing a pin therethrough to rotate said post, the slot $c^8$ being adapted for the use of a screw driver also for this purpose and it will be seen from this construction that the screw $i^2$ may be driven into the straight-edge at an angle and the post $i$ still assume its perpendicular relation with the said straight-edge. At the ends of the frame $h$ I provide slotted projections $h^6$ and adjacent the said ends are hook members $h^7$ both of which devices serve as guides for the line $a^3$ and I also provide a tube $h^8$ about the post $i$ to prevent dirt from entering the said frame. Within the frame $h$, adjacent the openings $h^4$ and $h^5$, are blocks $k$ and $k^2$ of wood, each of which is provided with an opening $k^3$ registering with the corresponding opening $h^4$ or $h^5$ and in each of which is secured a spirit tube $d^3$ but at right angles to each other and which are visible through the said openings.

Passing across the openings $k^3$ are two plates $k^4$ which are each adjacent the center of the spirit tubes and serve as an index therefor and, as the said plates are arranged perpendicular to the straight-edge $a$, it is necessary to look therebetween from a point directly over the center of the spirit tubes in order that the view shall be unobstructed by the said plates, thereby enabling the accurate gaging of the bubble in the said tube.

Adjustable at one end of the blocks $k$ and $k^2$ are two flat head screws $m$ which are slidable within the frame $h$ but closely engaging the sides thereof and at the opposite end of the said blocks are two round head screws which are accessible, for adjustment, through openings $m^2$ whereby a screw driver may be used to adjust the screws $m^3$, and the screws $m$ having been previously adjusted in the assembling of the device, adjustment of the screws $m^3$ adjusts the corresponding blocks and thereby the spirit tubes therein.

In the practice of either form of my invention, the post is first placed in position centrally of the straight-edge with the lug thereon at right angles to the normal position of the recesses in the opening for said post, the frame is then placed upon the said post, at right angles to the straight-edge, and, when turned longitudinally thereof, is locked in position, after which the line $a^3$ is placed in the guides already described and secured and the instrument is ready for use and, after having been once adjusted to a straight-edge, said instrument may be removed therefrom and connected thereto as often as desired and never need re-adjustment. It will also be seen that my instrument may be used without the straight-edge and may be laid upon either of its faces without danger of breaking the spirit tubes and but a small amount of room is necessary to store the same in a tool box and, in Fig. 7, I have shown glass plates $n$ which prevent dirt from entering the frame $h$ but do not prevent a reading of the spirit tubes.

It will be apparent that my instrument may be used as a level or as a plumb, with or without a straight-edge, and when used therewith may be easily adjusted thereto, new spirit tubes may be readily substituted in either form of construction in the event of breakage and adjustment of the said spirit tubes is possible with relation to the frame containing the same and it will also be apparent that any desirable features of either form of construction may be embodied in a combination of the two forms and various other changes in and modifications of the construction shown and described may be made without departing from the spirit of my invention or sacrificing its advantages.

Having fully described my invention, what I claim as new and desire to secure by Letters Patent, is:—

1. A device of the class described, comprising a casing having openings therethrough, a spirit tube adjacent each of said openings, means for adjusting said tubes, a straight-edge, a post arranged centrally of said casing, a screw loosely secured in said post and held in said straight-edge and means connected with the latter for holding said casing in a certain position.

2. A device of the class described, for use in connection with a straight-edge, comprising a casing having openings therethrough, a spirit tube adjacent each of said openings, a post detachably connected with said straight-edge and with said casing, and a cord secured to said straight-edge and engaged by said casing to insure a certain relation therebetween, said post being slotted at its top to receive said cord.

3. A device of the class described, comprising a casing formed of channeled material, blocks held in said channels, a spirit tube on each of said blocks, means for adjusting said blocks, a straight-edge, a post thereon and in engagement with said casing, centrally thereof, a cord connected with said straight-edge, devices on said casing for engaging said cord, and means for adjusting said devices.

4. In a device of the class described, a frame or casing, a block therein, a spirit tube on said block, a cylinder about said tube the ends of which are compressed and a screw passed through said compressed ends and into said block, whereby said spirit tube may be adjusted with relation to said block.

In testimony that I claim the foregoing as my invention I have signed my name in presence of the subscribing witnesses this 30th day of November 1907.

WILLIAM POTTER.

Witnesses:
GEORGE F. BENTLEY,
J. C. LARSEN.